Aug. 5, 1958     C. W. SPEICH     2,846,535

SHALLOW WATER ENGINE CUT-OUT

Filed Aug. 16, 1956

INVENTOR.
Charles W. Speich.
BY

ATTORNEY.

United States Patent Office 2,846,535
Patented Aug. 5, 1958

2,846,535

SHALLOW WATER ENGINE CUT-OUT

Charles W. Speich, Clay, N. Y.

Application August 16, 1956, Serial No. 604,528

6 Claims. (Cl. 200—61.44)

This invention relates to a power boat shallow water engine cut-out device.

In operating power boats, of the inboard or outboard type, there is constant danger of damage to the propeller, or the shearing of a propeller shear pin as a result of navigating in shallow water, should the propeller strike bottom, or a rock or other obstacle resting on the bottom. It is desirable that the engine driving the propeller be stopped instantly whenever shallow water, or a rocky shallow bottom is encountered, in order that the propeller may be protected from damage. If the engine is stopped sufficiently quickly, particularly in small outboard motor propelled boats, the instant power is cut off, the stern rises, so that should the craft proceed into the shallow water, extra clearance is almost instantly provided, during the brief period required for the motor and propeller to decelerate. Such extra clearance will act in most instances to save the propeller from damage which might otherwise result, should the craft continue its normal course over such shallow water under power.

It is an object of the present invention to provide a shallow water responsive device which may instantly act to stop the motor whenever water of a depth too shallow for safety to the propeller is encountered.

It is a further object of the invention to provide such a device which may be placed in operative position to detect shallow water, or placed in an inoperative position, so disposed as to be out of the way.

A further object of the invention is to provide such a device which may be readily installed on a boat without any substantial alteration of the boat.

The invention further has to do with a device so constructed as to be adapted to mounting on either side, and which when so mounted, may be relied upon to stop the motor, the instant the depth becomes too shallow for safe operation.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

In the drawings, wherein like reference characters indicate like parts:

Figure 1:
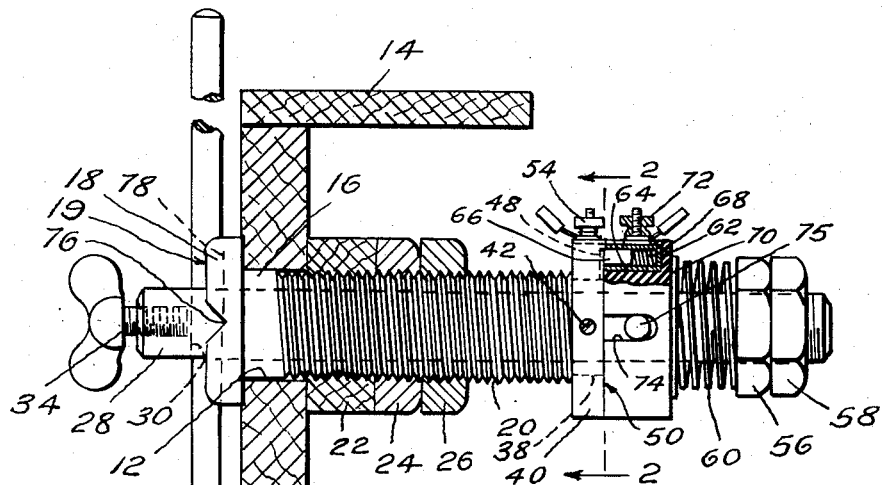
Figure 1 is a side elevational view of the device mounted in the side of a boat.

As shown in the drawing the side 10 of the boat is provided with a single round hole 12 well above the waterline and just below the decking 14, into which hole is snugly inserted a hollow sleeve 16, having a head flange 18 on the outer end. The inner end of the sleeve is exteriorly threaded as at 20. A wood washer 22 is threaded on the sleeve, and the flange of the sleeve is drawn up against the exterior of the boat side by tightening the nut 24 against the washer 22. A jamb nut 26 is provided to prevent loosening from vibration.

Slidably and rotatably extending through the sleeve 16 is a rock shaft 28. The outer end of such shaft is provided with a transverse bore 30, through which extends a feeler rod 32. Such rod may be clamped in any desired position by the thumbscrew 34. The rod is of sufficient length to extend below the bottom of the boat so as to effectively act as a feeler for shallow water, and the lower end of the rod may be curved inwardly as at 36 to follow to some extent the contour of the boat side. The rod may be adjusted in the bore 30, so as to extend as deep into the water as may seem desirable for adequate protection against operation of the boat in water of a depth too shallow for safety to the propeller.

The inside end of the sleeve 16 is stepped or reduced in diameter, as shown at 38, and has mounted thereon a collar 40 of insulating material such as fiber. Such collar is provided with a set screw 42, which may engage one or the other or radial apertures 44 or 46, in the reduced diameter portion 38 of the sleeve. The collar, on its inside face, is provided with a contact segment 48 set in flush with the face 50 of the collar, and such segment is provided with a lug portion 52 extending over the periphery of the collar upon which is mounted a binding post 54.

The end of the shaft 28 is threaded and provided with jamb nuts 56 and 58 which bear upon a compression spring 60, which spring in turn bears upon a collar 62. By reason of the spring pressure the collar 62 is slidably urged along the shaft 28 into engagement with the face 50 of the collar 40. The collar 62 is preferably of insulating material, and is provided with a plunger contact recess 64 extending parallel with the axis of the shaft 28. In such recess is a contact plunger 66 backed by a spring 68, the plunger being adapted to contact the segment 48. The spring plunger aperture may be lined with a conductive sleeve 70, in which the plunger slides, and such sleeve is electrically connected to a binding post 72 on the collar 62. The collar has a diametral slot 74 formed in the side thereof facing the collar 40, and a transverse pin 75 extends diametrically through the shaft 28, and its ends rest in the slot 74.

The construction thus provided permits the collar 62 to move axially along the shaft 28, while retaining the collar 62 against rotation relative to the shaft.

The flange 18 of the sleeve 16 on its outer face is provided with diametrally extending grooves 76 and 78, disposed at right angles to one another, and are of V-cross section to receive the feeler rod 32. The groove 76 extends vertically while the groove 78 extends horizontally. It will be seen that the thrust of the coil spring 60 urges the shaft 28 to the right, as shown in Figure 1, and holds the feeler rod 32 against the face 19 of the flange 18, and when the feeler rod is disposed in a vertical position, such rod will partially seat in the grooves 76, and be yieldingly held in such groove by the spring 60. At the same time such spring 60, acting against a washer 80, will urge the collar 62 against the collar 40, and thus hold the end of the contact plunger 66 under the light spring pressure of spring 68 against the insulating face 50, or contact segment 48 of the collar 40.

Figure 2:
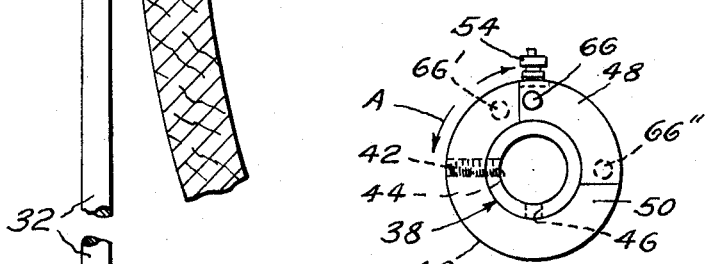
Figure 2 is a sectional view taken on the line 2—2 of Figure 1, with the contact plunger shown at different operational positions.
Figure 3:
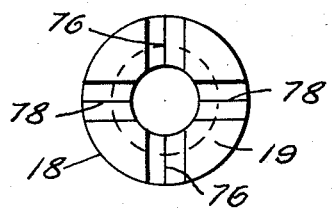
Figure 3 is an end elevational view of the sleeve flange.

In Figure 2, the collar 40 with the segment 48 are shown in elevation, and the contact plunger 66 is indicated as shown. Should the collar 62, carrying the plunger 66 be rotated as much as about 15° in the direction of arrow A, the contact plunger 66 will leave the segment 48 to the position 66' and if the segment 48 and plunger are connected in series with the engine ignition circuit the engine ignition circuit will be opened and the engine stopped by such rotation.

The feeler rod, when in the vertical position, extends below the boat, and the forward motion of the boat will move the end 36 of the feeler rod upon its striking bottom, and thus rotate the shaft 28 about 15 degrees, or enough to thus break the circuit. Such rod will cam out of the groove 76 and rest upon the face 19 of the flange 18 until manually reset to the vertical position. However, when the engine ignition circuit has thus been broken, the engine and propeller rapidly decelerate, the stern rises, the bow may lower and the feeler rod, if mounted near the bow may thus be caused to move as far as 30° from the vertical due to further contact with the bottom.

If it be desired to place the feeler rod in an inoperative position the lower end may be swung forward until the rod extends horizontal, at which time, the rod will rest in the grooves 78, where it will be yieldingly held. The collar at this time will be rotated 90° to move the plunger 66 to the position indicated at 66'', and since the segment 48 is about or somewhat greater than 90° in length, the ignition circuit will not be broken.

When it is desired to mount the device on the other side of the boat, the set screw 42 can be loosened, and the collar 40 reset, with the set screw seating in the other aperture 46 of the sleeve end and thus the device can be quickly made to accommodate mounting on either side of the boat.

It will be seen that a unitary device capable of being easily mounted upon the boat side has been provided, the same requiring but a small aperture for the purpose. In mounting, the nuts 24, 26, and collar 40 are removed from the sleeve, the sleeve oriented and set in place and the parts replaced. The shaft 28 may be assembled in the sleeve either by removing the feeler rod and inserting the feeler rod end of the shaft into the sleeve from the inside, or the nuts 56, 58, spring 60, collar 62 and cross pin 75 may be temporarily disassembled and the shaft projected inwardly through the sleeve, after which the parts are reassembled in proper oriented relation.

It will appear that the device is simple, reliable and effective in its action, since the instant the motor is cut off by feeler contact with the shallow bottom, the stern rises while the motor decelerates, thus lifting the propeller above the shallow bottom by a shaft margin, while the propeller and engine stop.

While a single embodiment of the invention has been illustrated and described, it is to be understood that the invention is not limited thereto. As various changes in the construction and arrangement may be made without departing from the spirit of the invention, as will be apparent to those skilled in the art, reference will be had to the appended claims for a definition of the limits of the invention.

What is claimed is:

1. A shallow water cut-off switch for power driven water craft comprising a bearing sleeve adapted to be rigidly mounted upon the side wall of a water craft with the sleeve axis extending substantially horizontal and transversely of the side wall, a shaft extending through said sleeve, said shaft having on its outer end a transverse feeler rod of a length to project vertically into the water to touch bottom in shallow water, switch means mounted on said sleeve and shaft adapted to make and break an electrical circuit upon relative rotation between said shaft and sleeve in response to said rod striking bottom in shallow water when the craft is under way and means coacting between the sleeve and shaft for yieldingly holding said feeler rod in a vertical downwardly projecting position.

2. A shallow water cut-off switch for power driven water craft comprising a bearing sleeve adapted to be rigidly mounted on a side wall of a water craft with the sleeve axis extending substantially horizontal and transversely of the side wall, a shaft extending through said sleeve, said shaft having on its outer end a transverse feeler rod of a length to project vertically downwardly into the water to touch bottom in shallow water, means mounted on said sleeve and said shaft adapted to make and break an electrical circuit upon relative rotation between said shaft and sleeve in response to said rod striking bottom in shallow water when the craft is under way, a circuit including said switch for interrupting the power craft engine ignition and means coacting between the sleeve and shaft for yieldingly holding said feeler rod in a vertical downwardly projecting position.

3. A shallow water cut-off switch for power driven water craft comprising a sleeve having a flange on one end thereof adapted to be rigidly mounted in and extend through an aperture in a side wall of a water craft, a shaft extending through said sleeve, said shaft having on its outer end a transverse feeler rod of a length to project downwardly into the water to touch bottom in shallow water, switch means mounted on said sleeve and the inner end of said shaft adapted to make and break an electrical circuit upon relative rotation between said shaft and sleeve in response to said rod striking bottom in shallow water when the craft is under way, means for yieldingly urging said shaft inwardly in respect to said sleeve, and a shallow vertically extending V groove in the outer face of said flange, for receiving said rod to releasably hold said rod in a vertical position until positively rotated by striking bottom in shallow water.

4. A shallow water cut-off switch for power driven water craft comprising a sleeve having a flange on one end thereof adapted to be rigidly mounted in and extend through an aperture in a side wall of a water craft, a shaft extending through said sleeve, said shaft having on its outer end a transverse feeler rod of a length to project downwardly into the water to touch bottom in shallow water, switch means mounted on said sleeve and the inner end of said shaft adapted to make and break an electrical circuit upon relative rotation between said shaft and sleeve in response to said rod striking bottom in shallow water when the craft is under way, means for yieldingly urging said shaft inwardly in respect to said sleeve, and shallow vertically and horizontally extending V grooves in the outer face of said flange, for receiving said rod to releasably hold said rod in a vertical position until positively rotated by striking bottom in shallow water or in a horizontal position.

5. A shallow water cut-off switch for power driven water craft comprising a sleeve having a flange on one end thereof adapted to be rigidly mounted and extend through an aperture in a side wall of a water craft, a shaft extending through said sleeve, said shaft having on its outer end a transverse feeler rod of a length to project downwardly into the water to touch bottom in shallow water, means mounted on said sleeve and the inner end of said shaft adapted to brake an electrical circuit upon relative rotation between said shaft and sleeve in one direction in response to said rod striking bottom in shallow water when the craft is under way, means for yieldingly urging said shaft inwardly in respect to said sleeve and shallow vertically and horizontally extending V grooves in the face of said flange, for receiving said rod to releasably hold said rod in a vertical position until positively rotated by striking bottom in shallow water or in an inactive horizontal position out of the water.

6. A shallow water cut-off switch for power driven water craft comprising a sleeve having a flange on one end thereof adapted to be inserted through an aperture in a side wall of a water craft, said sleeve having a threaded shank, and threaded menas thereon for clamping the flange of said sleeve against the outside of the side wall, a shaft extending through said sleeve, said shaft having on its outer end a transverse feeler rod of a length to project downwardly into the water to touch bottom in shallow water, switch means mounted on said sleeve and the inner end of said shaft adapted to make and break and electrical circuit upon relative rotation between said shaft and sleeve in response to said rod striking bottom in shallow water, means for yieldingly urging said shaft inwardly in respect to said sleeve, and a shallow vertically extending V groove in the outer face of said flange, for receiving said rod to releasably hold said rod in a vertical position until positively rotated by striking bottom in shallow water while the craft is under way.

References Cited in the file of this patent

UNITED STATES PATENTS

| | | |
|---|---|---|
| 743,939 | Shepard | Nov. 10, 1903 |
| 2,490,217 | Keating | Dec. 6, 1949 |